United States Patent
Boice et al.

[11] Patent Number: 6,097,757
[45] Date of Patent: Aug. 1, 2000

[54] REAL-TIME VARIABLE BIT RATE ENCODING OF VIDEO SEQUENCE EMPLOYING STATISTICS

[75] Inventors: Charles E. Boice, Endicott, N.Y.; Adrian S. Butter, Sunnyvale, Calif.; Agnes Y. Ngai, Endwell, N.Y.; Nader Mohsenian, Endicott, N.Y.; Robert Woodard, Newark Valley, N.Y.

[73] Assignee: International Business Machines Corporation, Armonk, N.Y.

[21] Appl. No.: 09/008,282

[22] Filed: Jan. 16, 1998

[51] Int. Cl.[7] .............................. H04N 7/36; H04N 7/50
[52] U.S. Cl. ............................. 375/240; 348/415
[58] Field of Search ........................... 375/240; 348/415, 348/409, 416, 417

[56] References Cited

U.S. PATENT DOCUMENTS

| | | | |
|---|---|---|---|
| 5,287,182 | 2/1994 | Haskell et al. | 348/500 |
| 5,301,242 | 4/1994 | Gonzales et al. | 382/56 |
| 5,365,272 | 11/1994 | Siracusa | 348/426 |
| 5,440,346 | 8/1995 | Alattar et al. | 348/420 |
| 5,469,212 | 11/1995 | Lee | 348/392 |
| 5,483,287 | 1/1996 | Siracusa | 348/426 |
| 5,781,788 | 7/1998 | Woo et al. | 712/1 |
| 5,793,895 | 8/1998 | Chang et al. | 382/236 |
| 5,978,029 | 11/1999 | Boice et al. | 348/412 |
| 6,040,861 | 3/2000 | Boroczky et al. | 348/409 |

*Primary Examiner*—Howard Britton
*Attorney, Agent, or Firm*—William H. Steinberg, Esq.; Heslin & Rothenberg, P.C.

[57] ABSTRACT

Method, system and computer program product are provided for adaptively encoding in hardware, software or a combination thereof a sequence of video frames in real-time. Pre-encode perceptual activity measurement processing is employed to derive statistics on each frame of the sequence of video frames to be encoded. The statistics are used by variable bit rate logic to obtain a number of bits to be used in encoding each frame. The number of bits to be used is provided to a single encoding engine, which encodes the sequence of video frames and produces a constant quality, variable bit rate bitstream output. The pre-encode processing employs a regulator as the global data flow control and synchronization for the encoder. Perceptual activity analysis on each frame of the sequence of video frames can derive information on, for example, shading, scene change, fade, color, motion and/or edge presence within the frame. Voting gives greater weight to the presence of certain characteristics within the frame.

30 Claims, 8 Drawing Sheets

REAL-TIME VARIABLE BIT RATE ENCODING OF VIDEO SEQUENCE EMPLOYING STATISTICS

CROSS-REFERENCE TO RELATED APPLICATION

This application is related to commonly assigned, United States Patent Application by Boroczky et al., entitled "Adaptive Real-Time Encoding Of Video Sequence Employing Image Statistics," filed Oct. 10, 1997, Ser. No. 08/948,442, now U.S. Pat. No. 6,040,861, the entirety of which is hereby incorporated herein by reference.

TECHNICAL FIELD

The present invention relates in general to compression of digital video images, and more particularly, to a technique for using image statistics derived from a video sequence to dynamically change one or more controllable encoding parameter(s) from frame to frame or within a frame to achieve real-time, variable bit rate encoding of the video sequence.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, and variable length coding. Video compression between pictures is accomplished via a process referred to as motion estimation and compensation, in which a motion vector plus difference data is used to describe the translation of a set of picture elements (pels) from one picture to another.

The ISO MPEG-2 standard specifies only the syntax of bitstream and semantics of the decoding process. The choice of coding parameters and tradeoffs in performance versus complexity are left to the encoder developers.

In video applications, it is advantageous to optimize encoding of digital signals in order to obtain the best density or compression of data. There are a number of known techniques to accomplish encoding, but complex pictures with frequent inter-frame changes may require more time for compression than is available on a per-frame basis.

This invention therefore seeks to enhance picture quality of an encoded video sequence while still obtaining a high compression rate by providing a real-time, variable bit rate encoding scheme.

DISCLOSURE OF THE INVENTION

Briefly described, the invention comprises in one aspect a method for encoding a sequence of video frames using a single encoding engine. The method includes: performing perceptual activity analysis on a frame of the sequence of video frames to derive information on at least one characteristic thereof; setting at least one controllable parameter for use in encoding the frame of the sequence of video frames based upon the information derived on the at least one characteristic thereof; and, encoding the frame of the sequence of video frames in real-time using the single encoding engine and the at least one controllable parameter.

In another aspect, the invention comprises a system for encoding a sequence of video frames which includes a pre-encode processing unit and a single encoding engine. The pre-encode processing unit comprises a perceptual activity measurement unit and a variable bit rate unit. The perceptual activity measurement unit performs perceptual activity analysis on a frame of the sequence of video frames to derive information on at least one characteristic thereof. The variable bit rate unit sets at least one control parameter based upon the information derived on the at least one characteristic. The at least one controllable parameter is subsequently used by the single encoding engine in encoding the frame of the sequence of video frames in real-time.

In still another aspect, the invention comprises a computer program product having computer usable medium with computer readable program code means therein for use in encoding a sequence of video frames using a single encoding engine. The computer readable program code means in the computer program product includes computer readable program code means for causing a computer to affect: performing perceptual activity analysis on a frame of the sequence of video frames to derive information on at least one characteristic thereof; setting at least one controllable parameter for use in encoding the frame of the sequence of the video frames based upon the information derived on the at least one characteristic thereof; and, encoding the frame of the sequence of video frames in real-time using the single encoding engine and the at least one controllable parameter.

In general, encoding in accordance with the principles of the present invention results in improved picture quality compared with non-adaptive encoder systems, especially at low bit rates. This because, for example, employing adaptive bit allocation among frames (as well as within frames) is more critical in low bit rate encoding compared with higher bit rate encoding. Further, the encoding technique of this invention can insure a semi-constant picture quality of a decoded video sequence in constant bit rate (CBR) mode or a constant picture quality in variable bit rate (VBR) encoding mode.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
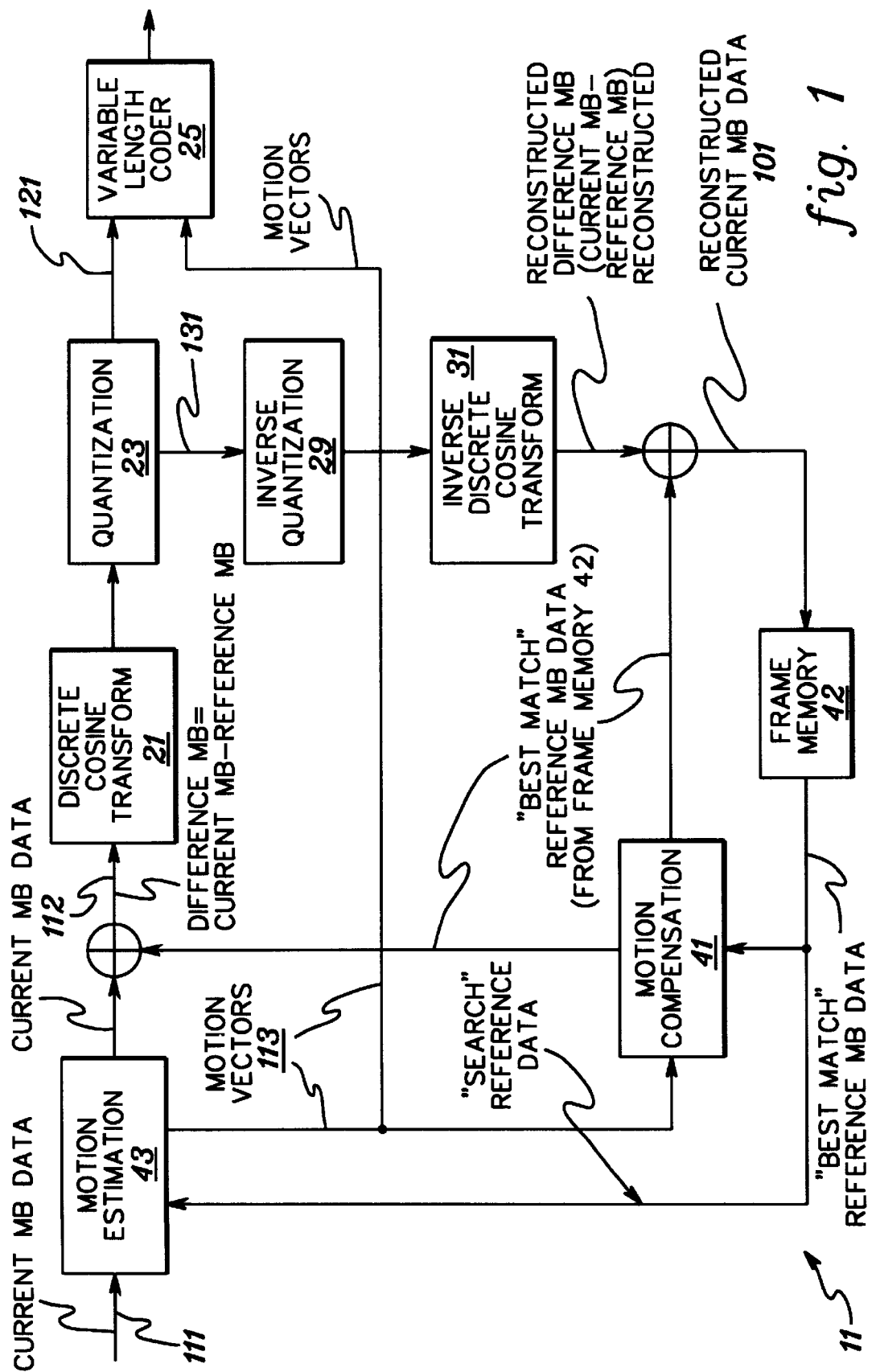
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the ith picture input 111, difference data 112, motion vectors 113 (to motion compensation 41 and to variable length coder 25), the picture output 121, the feedback picture for motion estimation and compensation 131, and the motion compensated picture 101. This figure has the assumptions that the ith picture exists in frame memory or frame store 42 and that the i+1$^{th}$ picture is being encoded with motion estimation.

The invention relates, for example, to MPEG compliant encoders and encoding processes as described in "Information Technology-Generic coding of moving pictures and associated audio information: Video," Recommendation ITU-T H.262, ISO/IEC 13818-2, Draft International Standard, 1994. The encoding functions performed by the encoder include data input, spatial compression, motion estimation/compensation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in a still picture of an "I" frame picture. Spatial redundancy is the redundancy within a picture. The MPEG-2 Draft Standard is using a block based method of reducing spatial redundancy. The method of choice is the discrete cosine transformation, and discrete cosine transform coding of the picture. Discrete cosine transform coding is combined with weighted scalar quantization and run length coding to achieve efficient compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are quantized and organized into a zig-zag or alternatescanned pattern, and converted into run-amplitude (run-level) pairs. Each pair indicates the number of zero coefficients and the amplitude of the non-zero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures, or alternatively, as "bidirectionally predictive-coded pictures" or "B" pictures. More particularly, this involves making a best estimate or prediction of where the pixels or macroblocks of pixels of the ith picture will be in the i-1$^{th}$ or i+1$^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart the images of the i$^{th}$ picture and the i+1$^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation unit 41 to retrieve macroblock data from previous and/or future pictures, referred to as "reference" data, for output by this unit. One output of the motion compensation unit 41 is negatively summed with the output from the motion estimation unit 43 and goes to the input of the discrete cosine transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
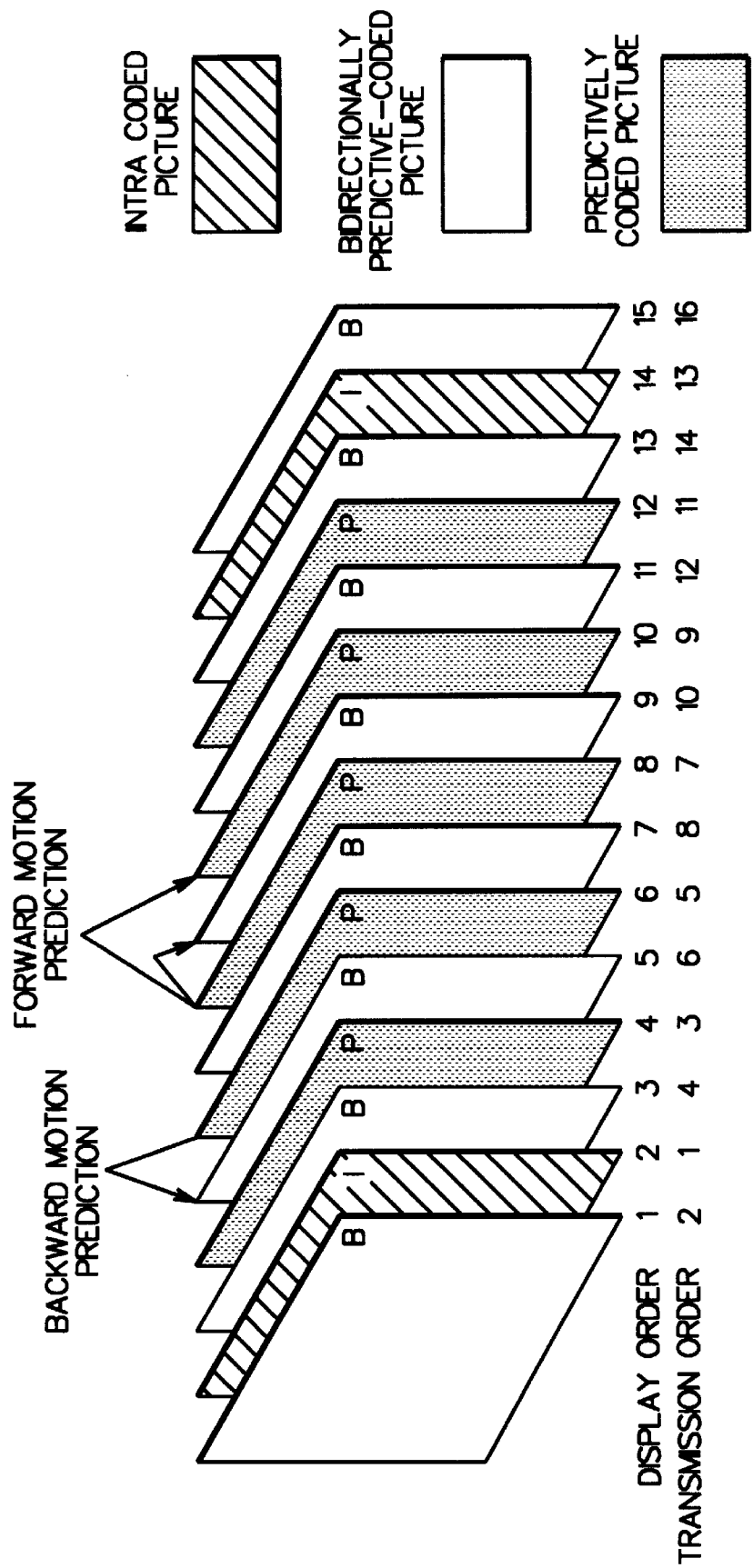
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
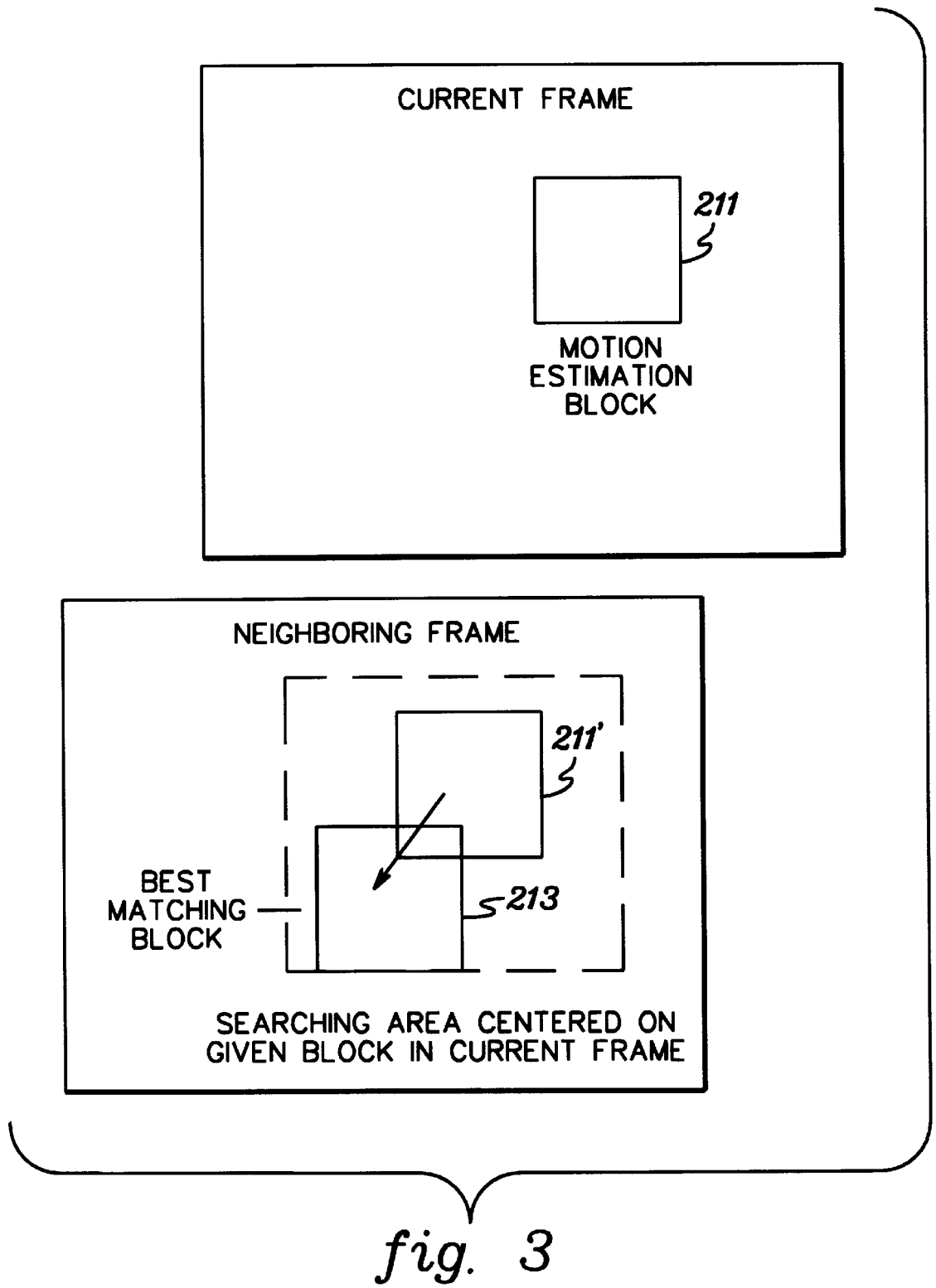
FIG. 3 illustrates the search from the motion estimation block in the current frame or picture to the best matching block in a subsequent or previous frame or picture. Elements 211 and 211' represent the same location in both pictures.
Figure 4:
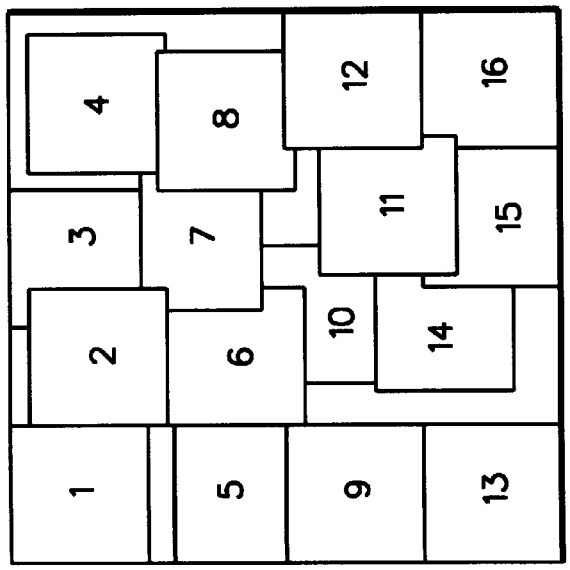
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, we look for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG-2 encoder are discussed in greater detail in commonly assigned, co-pending United States Patent Application Ser. No. 08/831,157, by Carr et al., filed Apr. 1, 1997, entitled "Control Scheme For Shared-Use Dual-Port Predicted Error Array," which is hereby incorporated herein by reference in its entirety.

As noted initially, encoder performance and/or picture quality may be enhanced in accordance with the principles of this invention through real-time video encoding. The video encoder is constructed to be adaptive to the video data received as a sequence of frames. Pursuant to this invention, a single encoding subsystem is employed in combination with pre-encode perceptual activity processing, which analyzes the video sequence prior to its real-time encoding. A delay buffer allows the perceptual activity measurement to be performed on frames of the video sequence prior to their encoding. The results are weighted and used to assign, for example, bit allocation for each frame in order to optimize picture quality. Analysis of the video sequence can comprise calculating one or more statistics from the video data.

The statistical measures can describe different characteristics of an image frame, for example, busyness of a frame, motion between image frames, scene change or fading, etc. Using the calculated statistics, adaptive encoding of the video sequence is carried out by controlling one or more encoding parameters of the real-time encoding process. For example, bit allocation, quantization parameter(s), encoding mode, etc., can be changed from frame to frame or macroblock to macroblock within a given frame according to derived statistics of a characteristic (e.g., scene content) of the particular frame(s).

Figure 5:
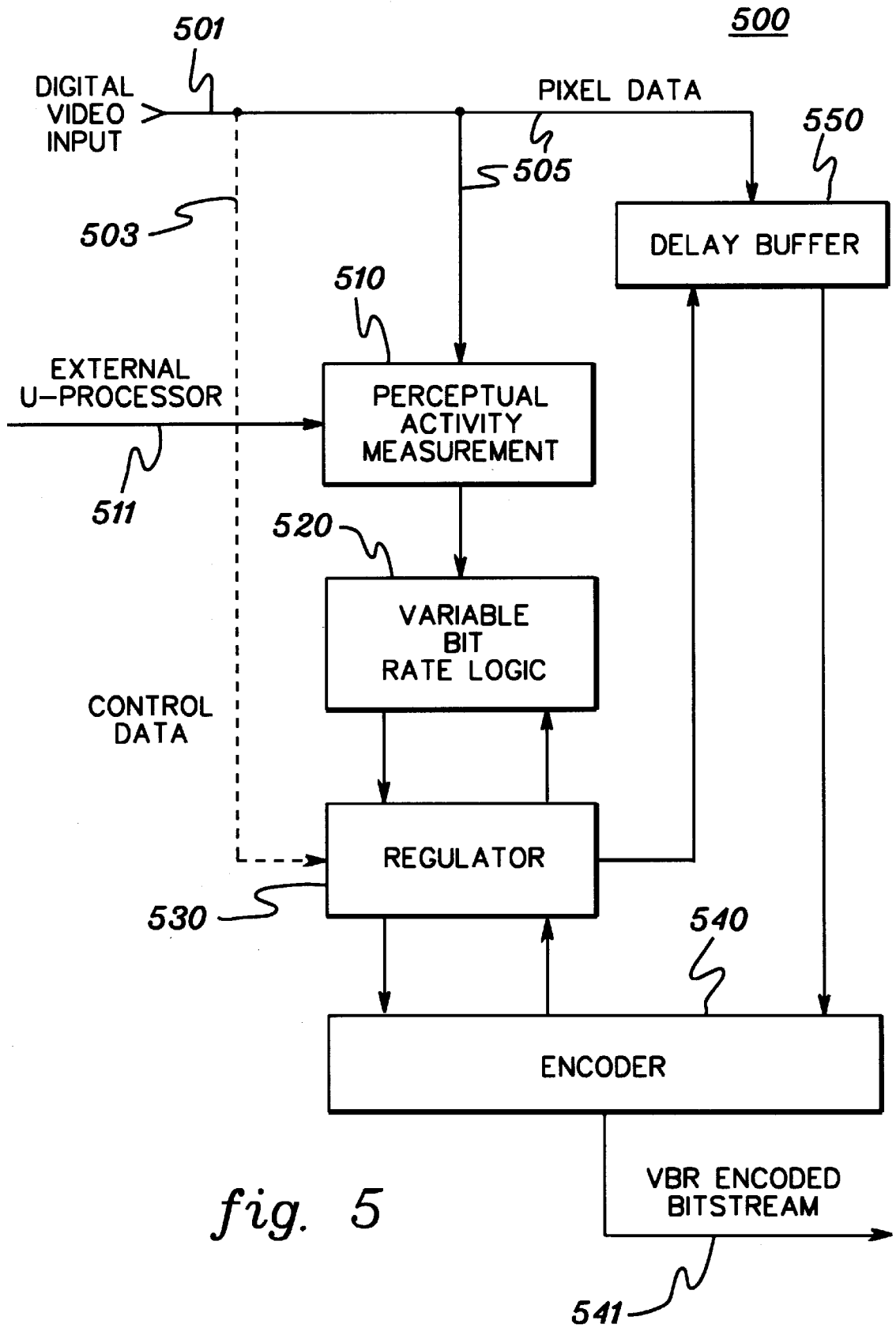
FIG. 5 shows one embodiment of a real-time encode system in accordance with the present invention. System 500 includes pre-encode processing comprising perceptual activity measurement unit 510, variable bit rate logic 520 and regulator 530 which together dynamically derive information on at least one characteristic of a frame of a video sequence to be encoded. This information is employed by encoder 540 to adaptively change the encoding rate of the sequence of frames, thereby optimizing picture quality and/or encoding performance.

One embodiment of an encoding system, generally denoted 500, in accordance with the principles of this invention is depicted in FIG. 5. The MPEG standard is again assumed herein for purposes of explanation; however, those skilled in the art will understand that other implementations and standards can employ the encoding concepts of this invention. System 500 includes a perceptual activity measurement unit 510, variable bit rate logic 520, a regulator 530 and a delay buffer 550, which provides a delayed video sequence (pixel data) to an encoder 540. Perceptual activity measurement unit 510, variable bit rate logic 520 and regulator 530 cooperate to generate the desired statistics, such as inter-frame/intra-frame non-motion, motion, etc., statistics which are important to the encoder's 540 specific bit rate control algorithm. Encoder 540 generates, in one example, a variable bit rate encoded bitstream 541.

Operationally, a sequence of video frames (i.e., digital video input) 501 is received and separated into control data 503 and pixel data 505. Control data 503 is fed to regulator 530, while pixel data 505 is forwarded to perceptual activity measurement unit 510 for analysis and to delay buffer 550. The delay buffer can accommodate a predefined number of frames of digital data to be encoded. This delay provides the perceptual activity measurement unit 510 with time to analyze the data and produce statistics on the received signal. External microprocessor 511 selects the statistics to be produced by the perceptual activity measurement unit. External microprocessor 511 is used to represent the user interactivity feature of the describing system. It is a function of VBR unit 520 to receive all required statistical information and inform encoder unit 540 (via regulator unit 530) the encoded bit allocation, average MQUANT value, etc., to use in encoding a given picture's pixel data.

As described further below, the external processor's main function is to tell the perceptual activity measurement unit which calculations to perform and which results to send to variable bit rate (VBR) logic 520. The perceptual activity measurement unit sends control signals to the VBR identifying which parameters are being sent. The variable bit rate logic assigns weighting factors to the PAM parameters to determine the number of bits to use for encoding the picture and any other relevant input parameters required by the encoder's rate control algorithm to officially carry out the picture encoding process.

Since the input video stream is buffered, statistical analysis can take longer than the available frame rate on a per-frame basis. For example, assume that the frame rate is $1/30^{th}$ of a second, and that frames 1, 2, 3 may be buffered. If frame 1 is analyzed in $1/300^{th}$ of a second, then $9/300^{th}$ of a second (i.e., 0.03 seconds) remains. Frame 2 can use this time for analysis while frame 1 is encoded, or a frame delay could be implemented so that frame 2 has $19/300^{th}$ of a second for analysis. This timing consideration can be readily implemented by one skilled in the art. By controlling timing, the external processor is provided with sufficient time to use processing power in the immediate past or immediate future frames, based upon current information, to enhance overall performance of the encode system.

Implementation of this invention can comprise software or hardware, or a combination thereof, configured to achieve the perceptual activity analysis goal disclosed herein. There are a wide variety of perceptual changes which can be detected, such as luminance, color, edges, motion, etc. Various perceptual analysis techniques are known in the art, any one of which can be employed within a system in accordance with this invention. Analysis can be accomplished by running video frames heavily laden with activity changes, and then those with little perceptual changes. The resultant data is analyzed for patterns which can then be used to select an encoding algorithm.

Returning to FIG. 5, and to again summarize, digital video input 501 is received and analyzed for perceptual change activity, while the data is simultaneously buffered in delay buffer 550. The perceptual activity statistics are passed to the VBR circuitry 520 where, for example, encoded picture bit allocation is performed. Thereafter, encoder 540 receives the delayed data and the statistics and performs the required encoding. Regulator 530 synchronizes the statistics generated by VBR unit 520 with the corresponding input picture fetched from delay buffer 550, and monitors the encoder process to keep the variable bit rate stream 541 in sync with the frame speed.

Figure 7:
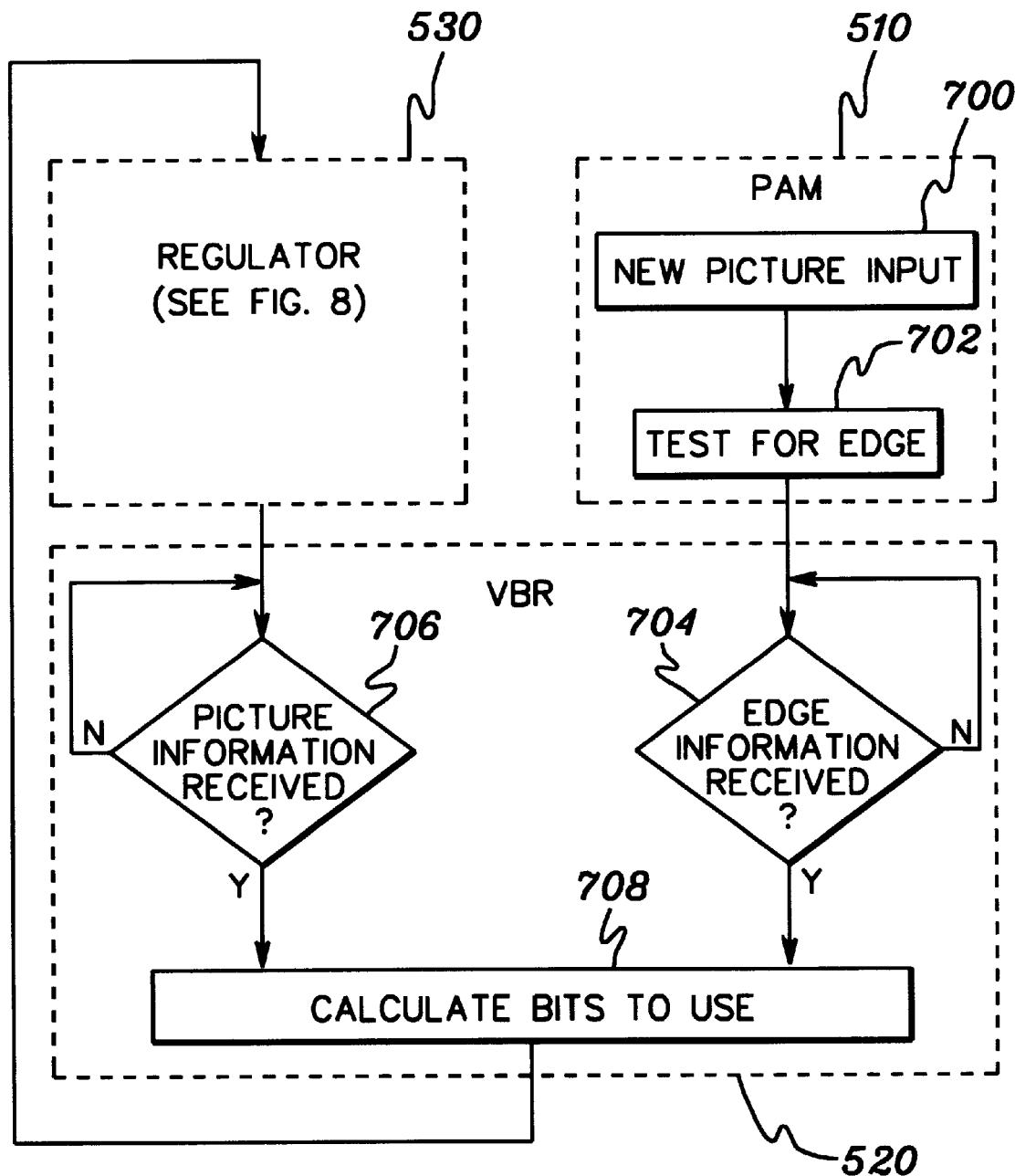
FIG. 7 is a flowchart of one embodiment of pre-encode processing implemented by perceptual activity measurement (PAM) unit 510, variable bit rate logic 520 and regulator 530 of the real-time encode system 500 of FIG. 5.
Figure 8:
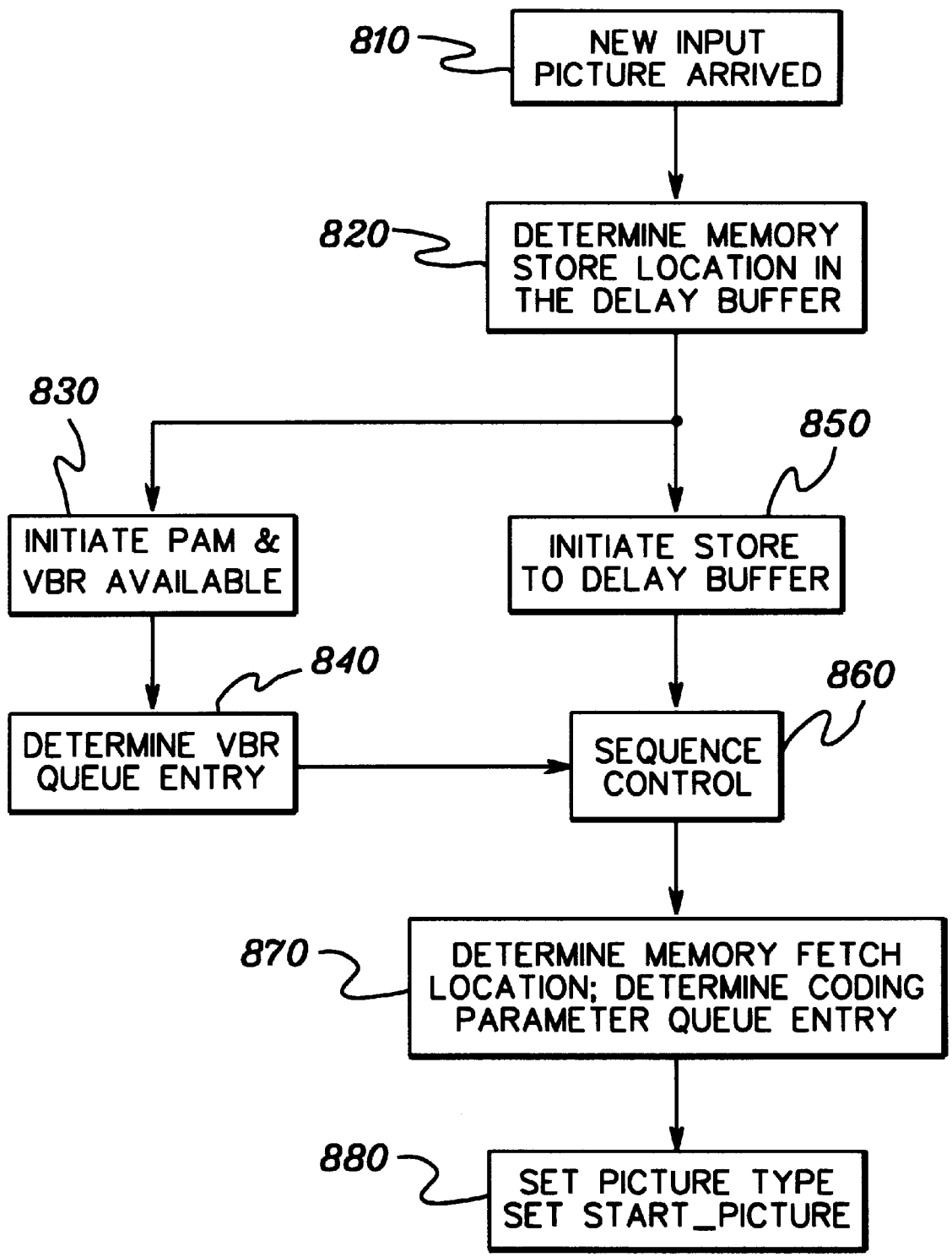
FIG. 8 is a flowchart of one embodiment of processing implemented by regulator 530 of the real-time encode system of FIG. 5.

Perceptual activity measurement unit 510, variable bit rate logic 520 and regulator 530 in accordance with this invention are each described in greater detail below with references to FIGS. 6–8.

Figure 6:
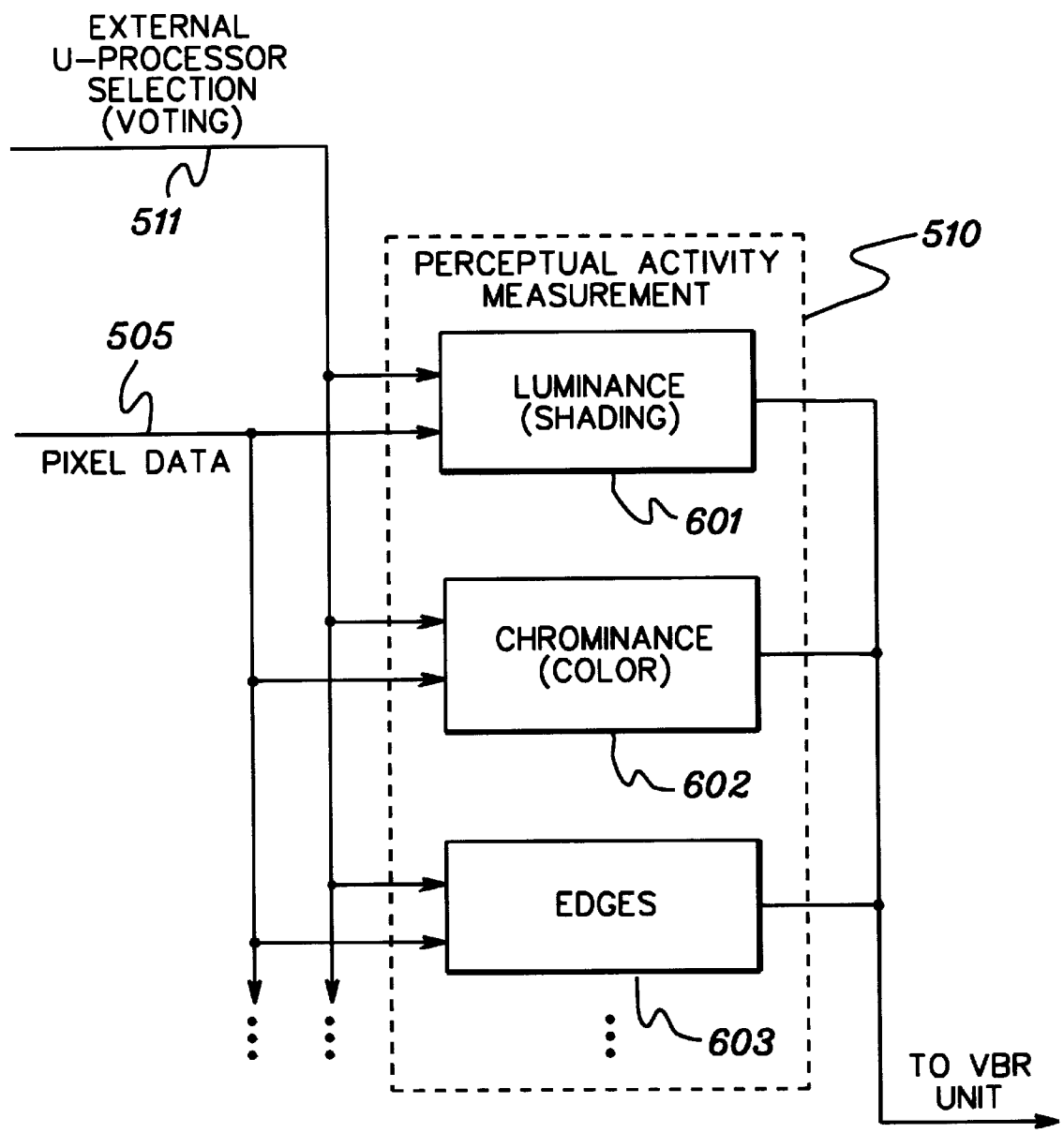
FIG. 6 is a generalized diagram of one embodiment of the perceptual activity measurement unit 510 of the real-time encode system 500 of FIG. 5. Depicted by way of example, perceptual activity measurement 510 includes logic for evaluating luminance 601, chrominance 602 and edges 603, as well as other characteristics of the video sequence.

FIG. 6 depicts an example of a perceptual activity measurement unit 510 which includes logic to evaluate luminance (shading) (601), chrominance (color) (602) and edges (603). The external microprocessor 511 can select the types of statistics to be calculated by the PAM unit.

By way of example, one detailed embodiment of edge detection logic 603 is described hereinbelow. Edges between arrangements of pixels within a macroblock can be detected as part of the spatial activity measurement, and then used in the calculation of perceived energy within a macroblock (i.e., calculation of perceptual MQUANT). Edge detection provides information and location of coefficients where a minimum quantization stepsize (i.e., MQUANT) is desirable. A large stepsize provides high compression, but creates more distortion. The opposite is true for a smaller stepsize. If there is a fine line in an image, a large stepsize may eliminate the line in the reconstructed image.

The desirability of employing edge detection when calculating perceptual MQUANT in an MPEG compliant video encoding system can be better understood from the following example. Selection of MQUANT in the conventional approach, described in the MPEG standard, is such that it uses a large MQUANT (large stepsize) for busy areas of video and small MQUANT (small stepsize) for non-active areas. This approach works well when the video sequence consists of only busy and non-busy blocks of pixels. This is because in the busy areas the distortion caused by using large stepsizes (large MQUANT) is masked by the image detail.

A significant drawback to the above-outlined approach is its deficiency in quantizing image blocks that contain hard edges. The conventional approach to adaptive quantization, classifies an edge-block as and therefore, a coarser quantization value is used. This results in severe artifacts in the edge areas and their neighboring pixels. Edges are image features that may extend over only a few pixels, yet are perceptually very important. An edge detection solution in accordance with this invention, therefore, identifies such image blocks and quantizes them for enhanced encoding. This is achieved by using a smaller MQUANT stepsize value for image blocks containing edges.

The identification of edge blocks by edge detection sub-unit 603 within the perceptual activity measurement unit can be performed by applying, for example, a Hadamard filter to pixel blocks within an image macroblock of a frame. One description of the Hadamard filter and its use in edge detection can be found in co-pending, commonly assigned United States Patent Application by Hall et al., entitled "Method and Apparatus For Adaptive Quantization," Ser. No. 08/618,659, filed Mar. 19, 1996, which is hereby incorporated herein by reference in its entirety. The main advantage of a Hadamard filter over other edge-detection methods is its ease of implementation. No multiplication is required in a Hadamard transform since the base Hadamard matrix consists of only 1's and –1's.

Based upon the above, edge detection processing as outlined herein improves upon the inherent masking approach imbedded in a conventional MPEG-2 perceptual MQUANT calculation. Again, edge detection is discussed by way of example only, and other perceptual activity changes can be readily monitored by those skilled in the art based upon the description presented herein.

Variable bit rate logic 520 receives picture content information (for example, edge detection information) from the perceptual activity measurement block, and group of picture (GOP) information, such as picture type, and number of B frames, as well as prior bit allocation information, from regulator 530 (FIG. 5). Logic 520 uses this information to calculate numerous encoding parameters which the regulator block then sends to encoder 540 to facilitate maintenance of a constant quality, variable bit rate bitstream 541.

The information (such as edge detection information) from the perceptual activity measurement unit is employed to predict the complexity of the current picture. The more complex the picture, the more bits are needed to insure that the picture will be encoded at the same quality level as previous pictures. Thus, as noted, the regulator provides the variable bit rate logic with bit allocation information including group of picture structure, picture type, and number of bits used to encode the previous picture. These inputs to variable bit rate logic 520 are depicted in the flowchart of FIG. 7, which presents one embodiment of certain processing implemented by perceptual activity measurement unit 510, VBR logic 520 and regulator 530.

As shown, perceptual activity measurement unit 510 receives a new picture input 700 and then tests for an edge 702. Once calculated, the edge information is forwarded to the VBR unit 520. Commensurate with receipt of this information, the VBR unit receives picture information 706 (as described above) from regulator 530. The VBR logic uses the picture content information, for example, edge information 704, and the picture type and encoding format information (i.e., picture information 706), to determine a number of bits 708 the current picture should consume in order to maintain a substantially constant picture quality. This number of bits is provided to regulator 530 for use in control of the encoder 540 (FIG. 5).

Allowable picture types are I, P and B pictures. Of these three picture types, the I picture type receives the most bits. This is due to the fact that P and B pictures will refer to I pictures for their motion estimation. Better quality on the I picture thus translates into better quality on P and B pictures. A P picture typically receives more bits than a B picture because it is used as a reference picture. The P picture refers to a previous I picture or to a previous P picture. The B picture typically has the fewest bits of the three picture types. The difference in bits used for picture type is principally achieved two ways, i.e., through motion estimation and/or through quantization.

Motion estimation is employed to find similarities between two pictures, with only the difference information being used. If the pictures are similar, then encoding the differences will use fewer bits than encoding the actual picture data. Skipping macroblocks is part of motion estimation, and allows parts of a picture that are exactly the same as their reference picture to go uncoded. The criteria for skipping macroblocks is more stringent for P pictures, again because of their use as reference pictures.

Quantization also controls bit usage. High quantization reduces the bits used, and also increases the amount of picture information lost in the encoding process. Quantization is scaled between three picture types, with I being the least quantized and B being the most quantized. Picture content information, along with picture type and GOP structure information, allows the VBR logic to accurately predict how many bits the current picture should consume to encode the picture with the same quality level as previous pictures in the video sequence. The quantization and motion estimation parameters comprise controllable parameters used in encoding the video sequence based upon the information derived by the pre-processing of the perceptual activity measurement unit and variable bit rate logic.

Regulator 530 (FIG. 5) is the global data flow control and synchronization for the encode system 500. The regulator manages two pipelines, i.e., input data and output data. This unit determines where to save each input picture data in delay buffer 550 and where to retrieve the data from for encoding by encoder 540. Since the input picture order does not match the output picture order, the regulator is responsible for determining a memory location for each input picture to be buffered. The amount of memory required in the delay buffer is dictated by the size of the pictures and the quantity of pictures that are to be buffered.

As each picture data is received and analyzed, the determined encoding parameters are placed in a queue in the regulator, and subsequently retrieved when the associated picture is to be processed. The regulator has to determine when to start processing a picture, which input picture to process, where to retrieve the picture data, and where to retrieve its associated coding parameters to initiate a start to the encoder. One embodiment of this process is depicted in FIG. 8. As shown, the regulator notes new input picture arrived 810 and determines a memory store location in delay buffer 550 for the frame 820. Thereafter, the regulator initiates the perceptual activity measurement and variable bit rate processing described hereinabove 830, and determines therefrom an encoded picture bit allocation 840 (i.e., an encoding parameter). The regulator simultaneously initiates storage of the received pixel data to the determined memory location in the delay buffer 850, and thereafter controls sequencing 860 for the encoder. The regulator determines the memory fetch location and the coding parameter queue entry 870 and forwards the information to the encoder, along with a set picture type and set start_picture 880.

Operationally, the regulator determines if the encoder system is ready to receive input picture data by monitoring for an appropriate output signal or other condition from the encoder. Using the IBM MPEG-2 encoder as an example, during power-on reset or when the encoder is paused, the encode system cannot receive input picture data and the INITCMP signal would be deactivated. When INITCMP is active, the regulator monitors the start of every input picture and determines the memory location in the delay buffer for storage. The regulator communicates the target memory location to the delay buffer and initiates the store process. The regulator also keeps a score of all unprocessed picture's status and location in memory. Each picture location is identified by a pointer. At the same time, the regulator initiates the start of perceptual activity measurements for the new picture. At the end of each input picture, the regulator expects coding parameters from the variable bit rate logic unit. The coding parameters are stored in a VBR queue within the regulator. The memory pointer is also saved in each queue entry and is used to associate the parameter with the picture data in memory.

The picture coding order is determined by availability of input picture, availability of coding parameters, GOP structure and availability of the encoder to accept these parameters. The GOP structure is selected by the user via the external microprocessor. With these inputs, the regulator determines when to start a picture through the coding process.

Those skilled in the art will note from the above discussion that encoding in accordance with the principles of the present invention will result in improved picture quality compared with conventional encoder systems. The encoding technique of this invention can insure a semi-constant picture quality of a decoded video sequence and constant bit rate (CBR) mode or a constant picture quality in variable bit rate (VBR) encoding mode.

The present invention can be included, for example, in an article of manufacture (e.g., one or more computer program products) having, for instance, computer usable media. The media has embodied therein, for instance, computer readable program code means for providing and facilitating the capabilities of the present invention. The articles manufactured can be included as part of the computer system or sold separately.

The flow diagrams depicted herein are provided by way of example. There may be variations to these diagrams or the steps or operations described herein without departing from the spirit of the invention. for instance, in certain cases the steps may be performed in differing order, or steps may be added, deleted or modified. All these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for encoding a sequence of video frames using a single encoding engine, said method comprising:
   (a) performing perceptual activity analysis on a frame of the sequence of video frames to derive information on at least one characteristic thereof;
   (b) setting at least one controllable parameter for use in encoding said frame of the sequence of video frames based upon said information derived on said at least one characteristic thereof; and
   (c) encoding said frame of the sequence of video frames in real-time using said single encoding engine and said at least one controllable parameter.

2. The method of claim 1, wherein said at least one controllable parameter of said setting (b) comprises at least one of a quantization parameter or a motion estimation parameter for use by said single encoding engine in encoding said frame of said sequence of video frames.

3. The method of claim 1, wherein said performing (a) comprises performing perceptual activity analysis on said frame of the sequence of video frames to derive information on at least one of shading, scene change, fade, color, motion or edge presence within said frame.

4. The method of claim 1, wherein said performing (a) comprises performing perceptual activity analysis on at least one subdivision, picture region, slice, macroblock or block within said frame of said sequence of video frames to derive information on said at least one characteristic thereof.

5. The method of claim 1, further comprising repeating said performing (a), said setting (b) and said encoding (c) in pipeline fashion for a plurality of frames of said sequence of video frames.

6. The method of claim 5, further comprising for each frame of said plurality of frames buffering said frame during said performing (a) and said setting (b), and wherein said method further comprises regulating said buffering and initiating of said encoding (c) to insure synchronization of encoding of each frame of said plurality of frames with the at least one controllable parameter set therefore.

7. The method of claim 6, wherein for each frame of said plurality of frames, said regulating includes controlling storing of said frame in a delay buffer during said performing (a) and said setting (b) and retrieving of said frame from the delay buffer prior to said encoding (c).

8. The method of claim 5, wherein said encoding (c) produces a variable bit rate bitstream from said plurality of frames of the sequence of video frames, and wherein said method comprises performing said steps (a)–(c) to maintain substantially constant quality in said variable bit rate bitstream.

9. The method of claim 8, wherein for each frame of said plurality of frames, said setting (b) comprises determining a number of bits to use in said encoding (c) of said frame, said determining of said number of bits to use being based on at least some of group of picture (GOP) information, picture type, number of B pictures between reference pictures in said sequence of video frames, bit allocation of at least one prior encoded frame of the sequence of video frames, and said derived information on said at least one characteristic of said frame.

10. The method of claim 1, wherein said performing (a) comprises performing perceptual activity analysis on a frame of the sequence of video frames to derive information on multiple characteristics thereof, and wherein said method further comprises for said frame, selecting among said information on said multiple characteristics thereof and providing said selected information to said setting (b).

11. The method of claim 10, wherein said selecting comprises weighting said information on each of said multiple characteristics, and said setting (b) comprises setting said at least one controllable parameter based upon said weighted information.

12. The method of claim 10, wherein said performing (a) comprises performing perceptual activity analysis on said frame of the sequence of video frames to derive information on at least some of shading, scene change, fade, color, motion and edge presence within said frame.

13. The method of claim 1, wherein said performing (a) comprises performing perceptual activity analysis on said frame of the sequence of video frames to derive information on edge presence within said frame, and upon said performing (a) detecting an edge within said frame, said setting (b) comprising setting a quantization parameter for a small stepsize, said quantization parameter comprising said at least one controllable parameter and being employed by said encoding (c) during encoding of said frame of the sequence of video frames.

14. The method of claim 1, wherein said setting (b) comprises setting multiple controllable parameters based upon said information derived on said at least one characteristic of said frame, and wherein said encoding (c) comprises encoding said frame of the sequence of video frames in real-time using said single encoding engine and said multiple controllable parameters.

15. A system for encoding a sequence of video frames comprising:
   a pre-encode processing unit, said pre-encode processing unit comprising:
      a perceptual activity measurement unit for performing perceptual activity analysis on a frame of the sequence of video frames to derive information on at least one characteristic thereof;
      a variable bit rate unit for setting at least one controllable parameter based upon said information derived on said at least one characteristic thereof, said at least one controllable parameter to be used in encoding said frame of the sequence of video frames; and
   a single encoding engine for encoding said frame of the sequence of video frames in real-time using the at least one controllable parameter set via said pre-encode processing unit.

16. The system of claim 15, wherein said at least one controllable parameter comprises at least one of a quantization parameter or a motion estimation parameter for use by said single encoding engine in encoding said frame of said sequence of video frames.

17. The system of claim 15, wherein said perceptual activity measurement unit comprises logic for performing perceptual activity analysis on said frame of the sequence of video frames to derive information on at least one of shading, scene change, fade, color, motion or edge presence within said frame.

18. The system of claim 15, wherein said pre-encode processing unit and said single encoding engine comprise means for pipeline processing a plurality of frames of said sequence of video frames.

19. The system of claim 18, further comprising a delay buffer and a regulator, said regulator coordinating for each frame of said plurality of frames: buffering of said frame in said delay buffer during processing of said perceptual activity measurement unit and said variable bit rate unit; and initiating said single encoding engine to encode said frame in synchronization with said at least one controllable parameter set by said variable bit rate unit.

20. The system of claim 15, wherein said single encoding engine comprises an MPEG compliant encoder, said MPEG compliant encoder producing a variable bit rate bitstream, and wherein said pre-encode processing unit comprises means for maintaining substantially constant quality in said variable bit rate bitstream output by said MPEG compliant encoder.

21. The system of claim 15, wherein said at least one controllable parameter comprises a number of bits to use by said single encoding engine in encoding said frame of the sequence of frames, and wherein said variable bit rate unit comprises means for determining said number of bits to use based on at least some of group of picture (GOP) information, picture type, number of B pictures between reference pictures in said sequence of video frames, bit allocation for at least one prior encoded frame of the sequence of video frames, and said derived information on said at least one characteristic of said frame.

22. The system of claim 15, wherein said perceptual activity measurement unit comprises means for deriving information on multiple characteristics of said frame of said sequence of video frames, and wherein said system further comprises processing means for weighting information on each of said multiple characteristics, said variable bit rate unit setting said at least one controllable parameter based on said weighted information.

23. The system of claim 15, wherein said perceptual activity measurement unit comprises means for performing perceptual activity analysis on said frame of the sequence of video frames to derive information on edge presence within said frame, and upon detection of an edge within the frame, said variable bit rate unit comprises means for setting a quantization parameter for a small stepsize, said quantization parameter comprising said at least one controllable parameter employed by said single encoding engine during encoding of said frame of the sequence of video frames.

24. A computer program product comprising a computer usable medium having computer readable program code means therein for use in encoding a sequence of video frames using a single encoding engine, said computer readable program code means in said computer program product comprising:
computer readable program code means for causing a computer to affect performing perceptual activity analysis on a frame of the sequence of video frames to derive information on at least one characteristic thereof;
computer readable program code means for causing a computer to affect setting at least one controllable parameter for use in encoding said frame of the sequence of video frames based upon said information derived on said at least one characteristic thereof; and
computer readable program code means for causing a computer to affect encoding of said frame of said sequence of video frames in realtime using said single encoding engine and the at least one controllable parameter.

25. The computer readable program code means of claim 24, wherein said at least one controllable parameter comprises at least one of a quantization parameter or a motion estimation parameter for use by said single encoding engine in encoding said frame of said sequence of video frames.

26. The computer readable program code means of claim 24, wherein said computer readable program code means for causing a computer to affect performing perceptual activity analysis on said frame comprises computer readable program code means for causing a computer to affect performing perceptual activity analysis on said frame of the sequence of video frames to derive information on at least one of shading, scene change, fade, color, motion or edge presence within said frame.

27. The computer readable program code means of claim 24, further comprising computer readable program code means for causing a computer to affect regulating of said performing of perceptual activity analysis on the frame and said setting of at least one controllable parameter, said computer readable program code means for causing a computer to affect regulating comprising computer readable program code means for causing a computer to affect buffering of said frame in a delay buffer and subsequent initiating of said encoding to insure synchronization of encoding of said frame with the at least one controllable parameter set therefore.

28. The computer readable program code means of claim 24, wherein said computer readable program code means for causing a computer to affect encoding of said frame produces a variable bit rate bitstream, and wherein said computer readable program code means further comprises computer readable program code means for maintaining substantially constant quality in said variable bit rate bitstream.

29. The computer readable program code means of claim 28, wherein said computer readable program code means for causing a computer to affect said setting of at least one control parameter comprises for each frame, computer readable program code means for causing a computer to affect determining of a number of bits to use in encoding said frame, said determining of said number of bits to use being based on at least some of group of picture (GOP) information, picture type, number of B pictures between reference pictures in said sequence of video frames, bit allocation for at least one prior encoded frame of the sequence of video frames, and said derived information on said at least one characteristic of said frame.

30. The computer readable program code means of claim 24, wherein said computer readable program code means for causing a computer to affect performing perceptual activity analysis comprises computer readable program code means for causing a computer to affect performing perceptual activity analysis on said frame of the sequence of video frames to derive information on multiple characteristics thereof, and wherein said computer readable program code means further comprises computer readable program code means for causing a computer to affect selecting among said information on said multiple characteristics of said frame and providing said selected information to said computer readable program code means for causing a computer to affect setting of said at least one controllable parameter.

* * * * *

UNITED STATES PATENT AND TRADEMARK OFFICE
CERTIFICATE OF CORRECTION

PATENT NO. : 6,097,757
DATED : August 1, 2000
INVENTOR(S) : Boice et al.

It is certified that error appears in the above-identified patent and that said Letters Patent is hereby corrected as shown below:

IN THE TITLE:

Delete "EMPLOYING STATISTICS" and replace with --EMPLOYING IMAGE STATISTICS--.

IN THE SPECIFICATION:

Col. 2, line 41, delete "This because" and replace with --This is because--.

Col. 2, line 63, delete "ith" and replace with --i$^{th}$--.

Col. 3, line 1, delete "ith" and replace with --i$^{th}$--.

Col. 4, line 55, delete "ith" and replace with --i$^{th}$--.

Col. 5, line 5, delete "generated" and replace with --once generated--.

Col. 7, line 9, delete "VBR identi" and replace with --VBR logic identi--.

Col. 8, line 24, delete "as and" and replace with --as busy, and--.

Signed and Sealed this

Twenty-fourth Day of April, 2001

Attest:

NICHOLAS P. GODICI

Attesting Officer

Acting Director of the United States Patent and Trademark Office